United States Patent
Decrop et al.

(10) Patent No.: US 11,922,672 B2
(45) Date of Patent: Mar. 5, 2024

(54) DYNAMIC MODIFICATION OF GEOFENCED DISPLAYS

(71) Applicant: International Business Machines Corporation, Armonk, NY (US)

(72) Inventors: Clement Decrop, Arlington, VA (US); Thomas Jefferson Sandridge, Tampa, FL (US); Jeremy R. Fox, Georgetown, TX (US); Zachary A. Silverstein, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 17/190,493

(22) Filed: Mar. 3, 2021

(65) Prior Publication Data

US 2022/0284231 A1 Sep. 8, 2022

(51) Int. Cl.
  *G06V 10/75* (2022.01)
  *G06F 18/214* (2023.01)
  *G06N 3/08* (2023.01)
(52) U.S. Cl.
  CPC ........ *G06V 10/7515* (2022.01); *G06F 18/214* (2023.01); *G06N 3/08* (2013.01)
(58) Field of Classification Search
  CPC .... G06V 10/7515; G06F 18/214; G06N 3/08; G06N 3/044
  USPC ......................................................... 382/293
  See application file for complete search history.

(56) References Cited

U.S. PATENT DOCUMENTS

| 10,067,565 B2 | 9/2018 | Ramaprakash | |
| 2020/0065840 A1* | 2/2020 | Pinel ....................... | H04W 4/02 |

FOREIGN PATENT DOCUMENTS

| JP | 2007194741 A | 8/2007 |
| WO | 03090168 W | 10/2003 |

OTHER PUBLICATIONS

Sriram Ramgopal, Sigride Thome-Souza, Michele Jackson, Navah Ester Kadish, Iván Sánchez Fernández, Jacquelyn Klehm, William Bosl, Claus Reinsberger, Steven Schachter, Tobias Loddenkemper; "Seizure Detection, Seizure Prediction, and Closed-Loop Warning Systems in Epilepsy"; Epilepsy & Behavior, vol. 3 (Year: 2014).*
"Empathy is our foundation, always. Now it's more important than ever", IBM Design, Last updated Jul. 20, 2020, 8 pages, <https://www.ibm.com/design/>.
"Epilepsy Society", Information produced: Mar. 2018, 15 pages, <https://epilepsysociety.org.uk/about-epilepsy/diagnosing-epilepsy/electroencephalogram-eeg>.

(Continued)

*Primary Examiner* — Neil R McLean
(74) *Attorney, Agent, or Firm* — Randy Tejeda (57) ABSTRACT

One or more computer processors establish a geofence surrounding a display having a plurality of pixels capable of change based on one or more display capabilities. The one or more computer processors monitor for a change in at least one pixel of the plurality of pixels. The one or more computer processors identify a photosensitive user within the established geofence. The one or more computer processors responsive to the at least one pixel change associated with the display, calculate a photosensitivity score utilizing a model trained for one or more photosensitive conditions associated with the photosensitive user. The one or more computer processors adjust the display to show a change on the at least one pixel based on the calculated photosensitivity score.

20 Claims, 7 Drawing Sheets

(56) References Cited

OTHER PUBLICATIONS

"Epilepsy Types and their Symptoms", Cleveland Clinic, Downloaded Dec. 17, 2020, 6 pages, <https://my.clevelandclinic.brg/health/diseases/9917-epilepsy-types-and-their-symptoms>.
"Eye Health Center", WebMD, @ 2005-2020, 3 pages, <https://www.webmd.com/eye-health/default.htm>.
"Internet of Things (IoT) on IBM Cloud", Downloaded Dec. 17,2020, 12 pages, <https://www.ibm.com/cloud/internet-of-things>.
"Photosensitive Epilepsy", WebMD, © 2020 WebMD, 8 pages, <https://www.webmd.com/epilepsy/guide/photosensitive-epilepsy-symptoms-causes-treatment#1>.
"Photosensitive Seizures", © 2020 Cedars-Sinai, 6 pages, <https://www.cedars-sinai.org/health-library/diseases-and-conditions/p/photosensitive-seizures.html>.
"Shedding Light on Photosensitivity, One of Epilepsy's Most Complex Conditions", Epilepsy Foundation, Downloaded Dec. 17, 2020, 7 pages, <https://www.epilepsy.com/article/2014/3/shedding-light-photosensitivity-one-epilepsys-most-complex-conditions-0>.
"The Hive", IBM A/NZ blog, Downloaded Dec. 17, 2020, 11 pages, <https://www.ibm.com/blogs/ibm-anz/>.
"Under the Microscope: iPhone Se LCD", YouTube, Downloaded Dec. 17, 2020, 2 pages, <https://www.youtube.com/watch?t=60&v=Z-3ziQIJAJw&feature=youtu.be>.
"Use of Flashing and Strobing Lights, including GIFs and Videos, Harmful to People with Epilepsy and Seizures", Epilepsy Foundation, Dec. 16, 2019, 3 pages, <https://www.epilepsy.com/release/2019/12/epilepsy-foundation-files-criminal-complaint-and-requests-investigation-response>.
Disclosed Anonymously, "Method and System for Dynamic Correction of Visual Impairments Via Parallel Reality", An IP.com Prior Art Database Technical Disclosure, IP.com No. IPCOM000262810D, IP.com Electronic Publication Date: Jul. 1, 2020, 4 pages.
Disclosed Anonymously, "Photosensitive Epilepsy Active Mitigation System", An IP.com Prior Art Database Technical Disclosure, IP.com No. IPCOM000263542D, IP.com Electronic Publication Date: Sep. 9, 2020, 4 pages.
Disclosed Anonymously, "Photosensitive Epilepsy Prevention through Screen Awareness Based Prediction", An IP.com Prior Art Database Technical Disclosure, IP.com No. IPCOM000261606D, IP.com Electronic Publication Date: Mar. 20, 2020, 6 pages.
Nakajima, Yohei, "Misapplied Sciences: How a "Magic Pixel" is Transforming a Screen Near You", Jan 9, 3 pages, <https://medium.com/scrum-ventures-blog/misapplied-sciences-how-a-magic-pixel-is-transforming-a-screen-near-you-27ecb2b00fb8>.
Nimrod et al., "Adapting Videos and Images To Determined Visually Related Impairments", An IP. com Prior Art Database Technical Disclosure, IP.com No. IPCOM000247443D, IP.com Electronic Publication Date: Sep. 8, 2016, 12 pages.
Smith, Dave, "It took 18 hours for Twitter to take down its own autoplay videos that triggered seizures", Jul. 10, 2015, 4 pages, <https://www.businessinsider.com/twitter-finally-removes-autoplay-videos-that-trigger-epilepsy-seizures-2015-7>.
Waltz, Emily, "A Wearable Chip to Predict Seizures", Dec. 6, 2017, 3 pages, <https://spectrum.ieee.org/the-human-ps/biomedical/devices/a-wearable-chip-to-predict-seizures>.
Wiggers, Kyle, "IBM's AI classifies seizure types to help people with epilepsy", Feb. 5, 2019, 5 pages, <https://venturebeat.com/2019/02/05/ibms-ai-classifies-seizure-types-to-help-people-with-epilepsy/>.
Wolfe et al., "A Twitter cyberattack on the Epilepsy Foundation posted strobing images that could trigger seizures", Dec. 17, 2019, 4 pages, <https://www.cnn.com/2019/12/17/tech/epilepsy-strobe-twitter-attack-trnd/index.html>.
Anonymous, "Dynamic Adjustment of Parallel-Reality Display Cone Based on Content-Sensitivity and "Snooping" Risk," An IP.com Prior Art Database Technical Disclosure, IP.com No. IPCOM000265873D, May 21, 2021, 6 pages.

* cited by examiner

DYNAMIC MODIFICATION OF GEOFENCED DISPLAYS

BACKGROUND

The present invention relates generally to the field of visual displays, and more particularly to dynamically modifying geofenced displays.

A geofence is a virtual perimeter for a real-world geographic area. A geofence could be dynamically generated, as in a radius around a point location, or a geofence can be a predefined set of boundaries (such as school zones or neighborhood boundaries). The use of a geofence is called geofencing, and one example of usage involves a location-aware device of a location-based service user entering or exiting a geofence. This activity could trigger an alert to the device's user as well as messaging to the geofence operator.

SUMMARY

Embodiments of the present invention disclose a computer-implemented method, a computer program product, and a system. The computer-implemented method includes one or more computer processers establishing a geofence surrounding a display having a plurality of pixels capable of change based on one or more display capabilities. The one or more computer processers monitor for a change in at least one pixel of the plurality of pixels. The one or more computer processors identify a photosensitive user within the established geofence. The one or more computer processors responsive to the at least one pixel change associated with the display, calculate a photosensitivity score utilizing a model trained for one or more photosensitive conditions associated with the photosensitive user. The one or more computer processors adjust the display to show a change on the at least one pixel based on the calculated photosensitivity score.

DETAILED DESCRIPTION

Frequently, as users travel through public and private areas, they are exposed to numerous displays and screens presenting a diverse array of content through varied presentation methods (e.g., brightness, resolution, colors, color patterns, refresh rates, color constraints, visual distance, etc.). Many users may be particularly sensitive to one or more presentation methods and techniques, specifically many users may have photosensitive conditions that may trigger psychological and physiological reactions (i.e., photosensitive reactions). For example, malignant or negligent actors may include content on one or more displays that can trigger photosensitive users in visual proximity to the one or more displays. In another example, photosensitive users have been targeted in social media attacks meant to trigger adverse health conditions (e.g., disorientation, seizures, etc.) for said users.

Embodiments of the present invention improve photosensitive content detection, mitigation, and adjustment through dynamic modification of a geofenced display in a proximity to one or more users based on a learned user profile, user preferences, and a trained model. Embodiments of the present invention improve the dynamic modification of a display by Internet of Things (IoT) and a parallel visualization environment to dynamically alter content only to a specific user that is affected by photosensitivity. Embodiments of the present invention protect users from exposure to screens or displays that may present photosensitive triggering content (i.e., pixel changes). Implementation of embodiments of the invention may take a variety of forms, and exemplary implementation details are discussed subsequently with reference to the Figures.

The present invention will now be described in detail with reference to the Figures.

Figure 1:
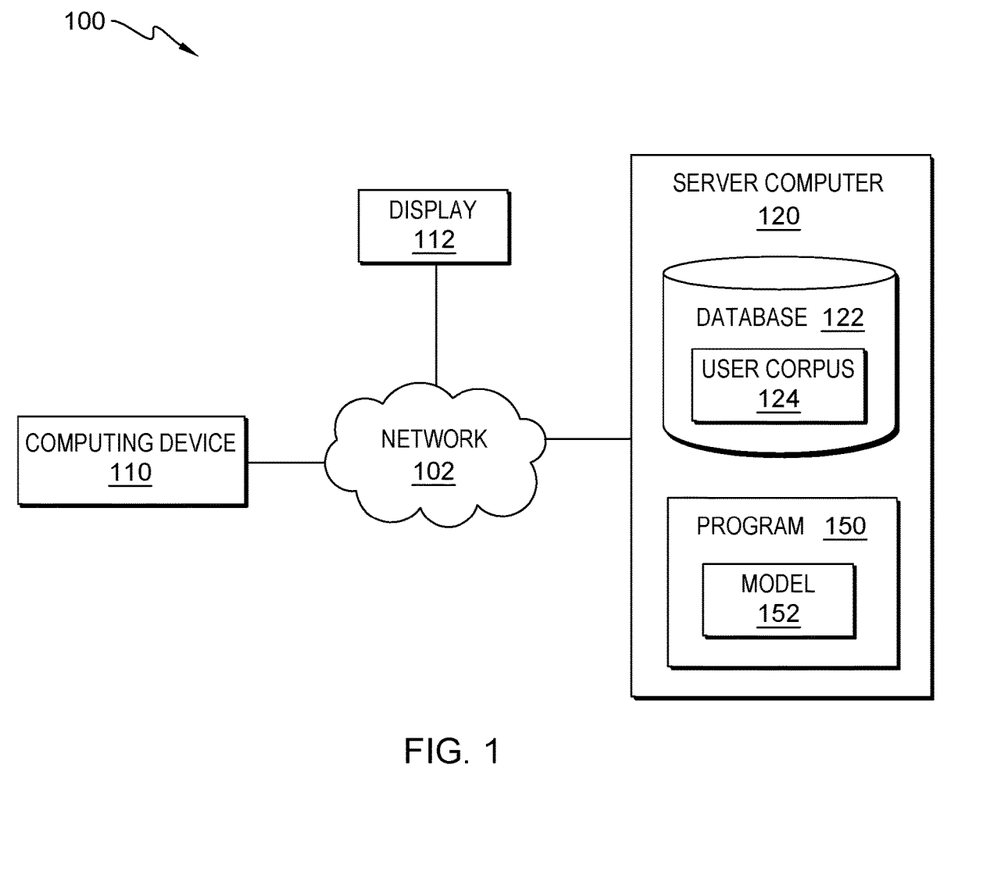
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes computing device 110, server computer 120, and display 112, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 110, server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Computing device 110 may be any electronic device or computing system capable of processing program instructions and receiving and sending data. In some embodiments, computing device 110 may be a laptop computer, a tablet computer, a netbook computer, a personal computer (PC), a desktop computer, a personal digital assistant (PDA), a smart phone, a fitness tracker, a smart watch, or any programmable electronic device capable of communicating with network 102. In other embodiments, computing device 110 may represent a server computing system utilizing multiple computers as a server system, such as in a cloud computing environment. In an embodiment, computing device 110 provides notifications of potential photosensitive content nearby. In another embodiment, computing device 110 provides notification of altered photosensitive content. In general, computing device 110 is representative of any electronic device or combination of electronic devices capable of executing machine readable program instructions as described in greater detail with regard to FIG. 7, in accordance with embodiments of the present invention.

Display 112 provides a mechanism to present data to a user and may be, for example, a computer monitor, a smartphone screen, jumbotron, or a public billboard display. In an embodiment, display 112 includes parallel visualization pixels that allow display 112 to present specialized content to a specific user while simultaneously presenting different content to another user. In a further embodiment, display 112 contains content multiplexing based on user viewing angle. In this embodiment, a plurality of users, simultaneously viewing display 112, are presented with distinct content and are unable to view content designated for another user. In another embodiment, program 150 serves as a passthrough module or application contained within display 112, allowing program 150 to add, modify, adjust, or remove all presented content. In another embodiment, display 112 provides location information (e.g., coordinates, viewing angles, height, location within a structure or building, etc.) and display capability information to program 150 via network 102.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with computing device 110 and other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and program 150. In other embodiments, server computer 120 may contain other applications, databases, programs, etc. which have not been depicted in computational environment 100. Server computer 120 may include internal and external hardware components, as depicted and described in further detail with respect to FIG. 7.

Database 122 is a repository for data used by program 150. In the depicted embodiment, database 122 resides on server computer 120. In another embodiment, database 122 may reside on computing device 110 or elsewhere within distributed data processing environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 includes user corpus 124 which stores data used by program 150, such as historical photosensitive user information, user medical records (e.g., historical epileptic information, photosensitive triggers, etc.), specific user photosensitivity (e.g., frequency of specific colors and/or patterns), associated user devices, and related sensor data, etc. In this embodiment, each user affirmatively opts into the data collection and has a respective user corpus 124 specific to the user conditions and preferences (e.g., approved locations, restricted locations, geofencing preferences (e.g., size, shape, etc.), etc.). In a further embodiment, user corpus 124 includes information specific to an individual user and/or user group. In this embodiment, this information may include user geographical information (e.g., country, region, city, town, etc.), related social media geolocational information, user calendar, or scheduling information (e.g., future meetings, device utilization, etc.). In another embodiment, a user profile contains associated computing device profiles and capabilities. In this embodiment, user corpus 124 includes one or more connections and user permissions to associated computing devices (i.e., GPS devices, navigation systems, mobile devices, etc.).

Program 150 is a program for dynamically modifying geofenced displays. In various embodiments, program 150 may implement the following steps: establish a geofence surrounding a display having a plurality of pixels capable of change based on one or more display capabilities; monitor for a change in at least one pixel of the plurality of pixels; identify a photosensitive user within the established geofence; responsive to the at least one pixel change associated with the display, calculate a photosensitivity score utilizing a model trained for one or more photosensitive conditions associated with the photosensitive user; and adjust the display to show a change on the at least one pixel based on the calculated photosensitivity score. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. In the depicted embodiment, program 150 includes model 152. Program 150 is depicted and described in further detail with respect to FIG. 2.

Model 152 is representative of a model utilizing deep learning techniques to train, calculate weights, ingest inputs, and output a plurality of solution vectors. In an embodiment, model 152 is trained for specific user photosensitive conditions. In this embodiment, model 152 inputs pixel changes (i.e., content) associated with one or more displays and patterns, outputting a photosensitivity score (i.e., epilepsy sensitivity score (e.g., probability of an epileptic event)). In an embodiment, model 152 is comprised of any combination of deep learning model, technique, and algorithm (e.g., decision trees, Naive Bayes classification, support vector machines for classification problems, random forest for classification and regression, linear regression, least squares regression, logistic regression). In an embodiment, model 152 utilizes transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods. In the depicted embodiment, model 152 is a recurrent neural network (RNN) trained utilizing supervised training methods. The training of model 152 is depicted and described in further detail with respect to FIG. 2.

The present invention may contain various accessible data sources, such as database 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data. Program 150 complies with all relevant copyright laws, medical privacy requirements, and user integrity rights.

Figure 2:
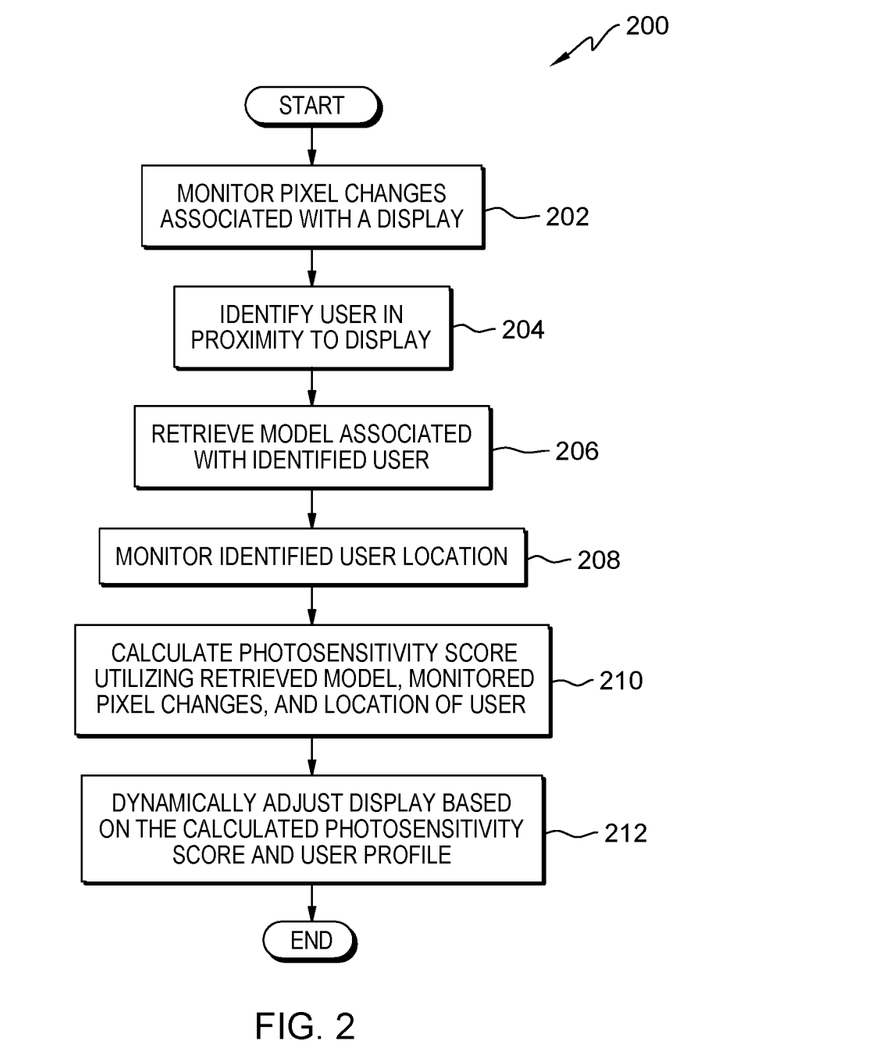
FIG. 2 is a flowchart depicting operational steps of a program, on a server computer within the computational environment of FIG. 1, for dynamically modifying geofenced displays, in accordance with an embodiment of the present invention.

FIG. 2 depicts flowchart 200 illustrating operational steps of program 150 for dynamically modifying geofenced displays, in accordance with an embodiment of the present invention.

Program 150 monitors pixel changes associated with a display (step 202). In an embodiment, program 150 commences responsive to a display identification or input of an identification (e.g., display location, access permissions, etc.) of one or more displays. In another embodiment, program 150 exists as a module or sub-program residing in display 112 or a computing device controlling display 112, automatically providing program 150 access to and control of the display and associated content. Responsive to program 150 identifying one or more displays, program 150 determines the capabilities of the detected displays. In an embodiment, said capabilities include, but are not limited to, display type, display performance capabilities or computing device capabilities (e.g., random access memory (RAM), central processing unit (CPU), graphics processing unit (GPU), network capabilities, etc.), display type, display resolution, display size, viewing angles, and aspect ratio. In an embodiment, program 150 determines display/device capabilities by pinging and polling every identified display. In another embodiment, program 150 establishes a geofence surrounding display 112 (i.e., display geofence) based on the determined capabilities of display 112. For example, program 150 establishes a circular geofence around display 112 with a 500-meter radius based on an effective viewing distance associated with the capabilities of display 112. In another embodiment, program 150 dynamically adjusts the display geofence based on current and predicted weather. In this embodiment, program 150 calculates the effect of the current weather on the capabilities of display 112 and adjusts the corresponding geofence. For example, program 150 reduces a display geofence based on significant rain in the area of the display reducing the effective viewing distance of the display.

Program 150 continuously monitors display 112 for one or more pixel changes (i.e., plurality of pixels changes in presented content) presented by display 112. In an embodiment, a pixel change is any change in the state (e.g., color, frequency, pattern, intensity, etc.) of a pixel or set of pixels. For example, a set of pixels changing from a red color to a green color. In another embodiment, exemplary pixel changes include flashing screen lights, dramatic pixel changes (e.g., bright colors to darker colors), flickering pixels, checkered patterns, and striped patterns. In an embodiment, program 150 monitors display 112 utilizing hardware and/or software level pixel detection to identify and analyze pixel changes in real time. In this embodiment, program 150 utilizes a software layer associated with display 112 to detect content that will render on display 112 and detect abrupt pixel changes through a maintained map comprising each rendered pixel either through the entirely of display 112, certain portions of display 112, or random selected screen areas of display 112 (e.g., pixels dedicated to the presentation of a specific application). In another embodiment, program 150 utilizes a hardware layer associated with display 112 to monitor pixels at the RGB (red, green, and blue) level or transistor level. In another embodiment, program 150 identifies patterns and content associated with the detected one or more pixel changes. For example, program 150 identifies a set of pixel changes as the content presented on display 112 alternates between advertisements. In another example, program 150 continuously identifies and analyzes content within a social media post, on a website, within an individual or group text message, a general display, or any other social collaboration tool. In an embodiment, program 150 stores all pixel changes and associated patterns into database 122 and associates said changes with display 112. In this embodiment, program 150 creates a plurality of training sets specific to the pixel changes and content changes presented on display 112. In another embodiment, program 150 maintains a pixel change buffer allowing program 150 to modify or block pixel changes before said pixel changes are rendered on display 112.

Program 150 identifies a user in a proximity to the display (step 204). In an embodiment, program 150 identifies each user within the established geofence (e.g., proximity) of display 112. In some embodiments, a user preregisters computing device 110 with program 150, associating said device with the user. In other embodiments, program 150 receives a notification a user has entered the established display geofence (e.g., 500-meter circular geofence). For example, program 150 receives a notification from a smart device of a user (e.g., computing device 110) if the user is traveling or predicted to travel through the established geofence. In an embodiment, when a user of a computing device 110 enters wireless communication range with display 112, program 150 identifies the user of computing device 110. In some embodiments, responsive to computing device 110 communicating with program 150, program 150 may identify the user associated with communicating computing device 110. For example, a user registers a mobile device, and when the user utilizes the mobile device, program 150 recognizes the user associated with the mobile device. In an embodiment, a user may also link an associated user corpus 124 to computing device 110 and program 150. For example, when the user begins to travel with computing device 110, program 150 identifies the user and the social networks associated with computing device 110. In another embodiment, program 150 utilize computing device GPS, wireless communication networks, or Internet of Things (IoT) device connectivity to identify the user. For example, if one or more smaller devices are within a certain proximity of each other, then the user is identified if said devices are on the same network.

Program 150 retrieves a model associated with the identified user (step 206). In an embodiment, program 150 creates, accepts, or retrieves user corpus 124 or model 152, specific to the identified user. In an embodiment, program 150 creates or retrieves one or more training sets from user corpus 124. In yet another embodiment, a user inputs one or more training sets into program 150. In an example, program 150 retrieves training sets that include exemplary pixel changes or content, associated displays, and conditions (e.g., visual distances, angles, weather effects, associated locations, etc.) corresponding with respective user conditions, reactions, parameters, and preferences. In a further example, said training sets are associated with respective geofencing parameters. In another embodiment, program 150 incorporates user approved electronic medical records to supplement the information contained in user corpus 124.

Responsively, program 150 utilizes database 122 and user corpus 124 to train model 152 specific to each user. In an embodiment, model 152 is trained to calculate a photosensitivity score representing predicted user photosensitive reactions (e.g., distortion, seizures, etc.) and predicted user risk based on one or more pixel or content changes on display 112. In another embodiment, model 152 provides a photosensitive reaction probability representing a likelihood of one or more photosensitive reactions to one or more pixel changes. In this embodiment, a photosensitive reaction is triggered by visual stimuli that form patterns, such as flashing lights; bold, regular patterns; or regular moving patterns. In an embodiment, program 150 trains model 152 utilizing training data contained within user corpus 124. In a further embodiment, program 150 trains model 152 by utilizing a plurality of training methods (e.g., supervised, unsupervised, etc.) based on constructed feature vectors contained within user corpus 124. In an embodiment, program 150 trains model 152 with a plurality of feature vectors originating from the sets extracted from the training data and associated labels contained in user corpus 124. In another embodiment, model 152 is a recurrent neural network trained with a supervised training method. As would be recognized by one skilled in the art, supervised training determines the difference between a prediction (i.e., predicted photosensitive reaction) and a target reaction, and, in the case of a neural network, back-propagates the difference through the layers such that said model "learns". In an embodiment, program 150 determines whether a sufficient accuracy is obtained by utilizing test sets and the associated test labels. In another embodiment, program 150 utilizes cross-entropy (e.g., Kullback-Leibler (KL) divergence, etc.) as a loss function to determine the level of accuracy of the model. In this embodiment, program 150 compares a predicted reaction with an expected. In an embodiment, program 150 utilizes trained model 152 to learn the specific behavior of the user and tailor user corpus 124.

Program 150 monitors identified user location (step 208). In the depicted embodiment, program 150 receives the location of the user from a GPS (not depicted) contained with computing device 110. In an embodiment, program 150 utilizes a map application (not depicted) contained within computing device 110 to calculate the map position and street position of the user. In one embodiment, program 150 utilizes the map application to determine the specific street address of the user. In other embodiments, program 150 utilizes mobile phone tracking, via triangulation of radio signals between cell towers. In another embodiment, program 150 may utilize video/image recognition to determine the location of the user. For example, as the user walks, program 150 determines the location of the user by analyzing the video stream from a live stream to identify street names, buildings, or landmarks. In another embodiment, program 150 may prompt the user to input the location. In another embodiment, program 150 establishes a dynamic user geofence surrounding the location of the user. In this embodiment, program 150 creates the user geofence utilizing user corpus 124 and model 152 (e.g., user specific photosensitivity triggers). For example, program 150 creates a large circular geofence with a radius of half a mile that follows the user as the user travels in a city area. In this example, program 150 identifies and monitors displays and content that are presented with the user geofence.

Program 150 may determine the orientation and/or location of the user relative to display 112. In an embodiment, program 150 utilizes sensors (not depicted) to determine the orientations and locations of all user associated computing devices relative to display 112. In a further embodiment, program 150 utilizes proximity sensors (not depicted) located in each device to determine said locations. For example, program 150 utilizes proximity sensors (not depicted) located within display 112 and computing device 110 to determine that the user is located to the left of display 112 and that the user is within a 4 feet radius of display 112. In yet another embodiment, program 150 utilizes orientation sensors contained within computing device 110, such as an accelerometer (not depicted) to determine the orientation of the user. In another embodiment, program 150 determines the distance between the computing device 110 (i.e., the user) and display 112. For example, computing device 110 is determined to be located to the left of display 112 at a 2-degree viewing angle at a 3-meter viewing distance of display 112. In another embodiment, program 150 tracks the eye movement of the user relative to display 112.

Program 150 calculates a photosensitivity score utilizing the retrieved model, the monitored pixel changes, and the location of the user (step 210). Program 150 inputs the current location, viewing angle, and distance of the user, as described in step 208, into trained model 152, as described in step 206. In addition, program 150 inputs one or more pixel changes associated with display 112 into trained model 152. In an embodiment, program 150 utilizes trained model 152 to output a photosensitivity score based on the inputted factors stated above. In this embodiment, program 150 inputs a vector containing a sequence of pixel changes into user specific model 152 and program 150 utilizes model 152 and one or more calculations to generate the photosensitivity score relevant to the conditions of the user, pixel changes, and user location relative to display 112. For example, a highly photosensitive user is approaching a geofence encompassing display 112 presenting potentially harmful photosensitive content. In this example, program 150 monitors the photosensitive user and continuously generates a photosensitivity score, specific to the photosensitive user, as the user continues to travel within the geofence. Said calculated photosensitivity score will vary due to pixel changes, changes to the location of the user, and user state (e.g., physiological and/or emotional conditions).

Program 150 dynamically adjusts the display based on the calculated photosensitivity score and user profile (step 212). In an embodiment, program 150 utilizes the calculated photosensitivity score, as described in step 210, to dynamically adjust display 112 according. In an embodiment, utilizing the output of model 152, program 150 determines whether the calculated photosensitivity score, associated with the user location and the one or more pixel changes, exceeds a photosensitivity score threshold. In various embodiments, program 150 utilizes a predefined photosensitivity score threshold. In another embodiment, program 150 adjusts the photosensitivity score threshold based on user corpus 124. For example, program 150 assigns a highly photosensitive user a low photosensitivity score threshold indicating that slight photosensitive content may trigger a photosensitive reaction (e.g., epileptic incident).

Responsive to the calculated photosensitivity score meeting or exceeding a photosensitivity score threshold, program 150 may create a parallel visualization environment, utilizing display 112, directed specifically to the user. In an embodiment, the created parallel visualization environment allows only the targeted user (e.g., photosensitive user) to view targeted content (e.g., changed pixels or portions of display 112), while preventing the targeted user from viewing the one or more pixel changes that may contain harmful photosensitive content. In this embodiment, program 150 utilizes the user location and tracked user eye movement to direct content to the user and only to the user, in the parallel visualization environment, without changing the displayed content for other individuals. This embodiment enables program 150 to protect the identity and medical privacy of the user. In a further embodiment, the parallel visualization environment utilizes a display comprising a plurality of pixels with highly controllable light rays comprising a plurality of colors. In a further embodiment, as the user travels through the display geofence, program 150 continues to track the user and deliver the specialized content (i.e., low photosensitive reaction risk) while shielding the user from potential photosensitive triggering content. In another embodiment, program 150 can directly block the one or more pixel changes from rendering.

In a further embodiment, program 150 initiates a full block where program 150 blocks all pixel changes from rendering for all users (e.g., blocking a photosensitive social media post). In another embodiment, program 150 initiates a partial block where program 150, based on the user preferences, blocks a portion of display 112 or a subset of the one or more pixel changes. In an embodiment, program 150 alerts the user to the potential photosensitive content and/or notifies the user of changed content specific to the user. In this embodiment, the user can allow others in their network to see the same content presented to them while restricting other users from viewing the content. In another embodiment, program 150 continues to block content until the user exits the geofence of display 112 or responsive to user affirmation to unblock. In this embodiment, program 150 notifies the user of the potential consequences of unblocking said content. In another embodiment, program 150 utilizes social pass-thru techniques allowing a first user to request that a second, trusted, user test the content (i.e., set of pixel changes) and confirm that the content is not harmful, before allowing the first user to view said content. In another embodiment, program 150 alters the content to reduce potential photosensitive reactions. For example, program 150 skips portions of content that are identified as potentially harmful while retaining content that is deemed safe. In another example, program 150 slows the frequency of the pixel changes to reduce the number of potential flashes (e.g., pixel changes) per second.

If program 150 is unable to prevent the user with a high likelihood of a photosensitive reaction, then program 150 accesses one or more computing devices associated with the user to gather user physiological information (e.g., user temperature, heart rate, etc.). For example, program 150 utilizes an accelerometer contained with an associated user computing device or associated IoT devices to detect a sudden change (i.e., gradient) in user body position or location. Here, if the position gradient and associated derivatives (e.g., velocity and acceleration) are extremely divergent and accompanied with a detection of force (e.g., a phone hitting the ground), then program 150 trigger a prompt to the user for additional information and identifies if the user needs assistance. Continuing, if no user action takes places within a predefined time period, then program 150 alerts nearby authorities and/or someone in the contact list of the user (e.g., emergency contact, doctor, specialist, etc.).

In an embodiment, program 150 utilizes historical content, associated user reactions, and feedback to determine whether similar situated users would also be affected by the content. For example, if a user watches a video and provided program 150 feedback that the video caused them discomfort, then the next time that video, platform independent, is played by another user with similar preset parameters, user corpus, model, and/or a warning display would appear notifying the user of a potential photosensitive reaction. In a further example, if the video is shared from one platform to the other or if it is allowed in the shareable link, program 150 establishes parameters to notify photosensitive users while not affecting users without photosensitive conditions. In an embodiment, program 150 is scalable to specific groups or subsets of users that can be identified with unique visual, audio, or other types of specific usability requirements based on conditional requirements. In another embodiment, program 150 utilizes historical content, associated user reactions, and feedback to adjust one or more display geofences. For example, program 150 increases the radius of a display geofence based on increased reports of discomfort from a plurality of users.

Figure 3:
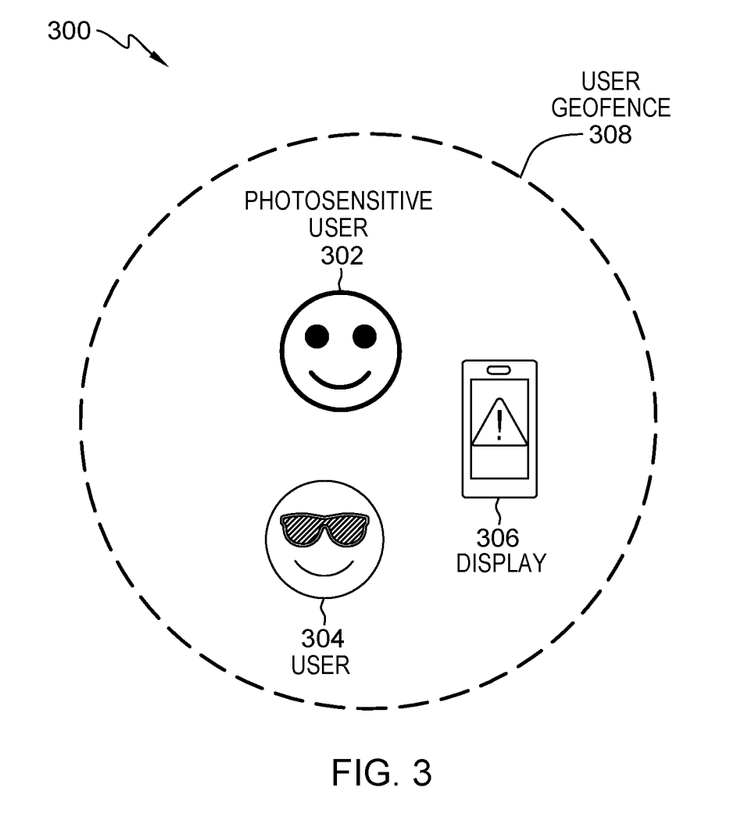
FIG. 3 depicts an example of the operational steps of the program within the computational environment of FIG. 1, in accordance with an embodiment of the present invention.

FIG. 3 depicts example 300, in accordance with an illustrative embodiment of the present invention. Example 300 contains photosensitive user 302 and user 304 viewing social media content presented on display 306. Here, photosensitive user 302 is associated with user geofence 308 directing program 150 to identify and monitor all viewable displays within user geofence 308. In example 300, a pending social media video is determined to display extreme flashes, which could prove to be dangerous for photosensitive user 302. Program 150 detects the video is potentially harmful and changes the specific content. Program 150 alters the harmful content and provides a warning on the video alerting both users that they are viewing an altered video due to an elevated photosensitivity risk or probability as determined by program 150 and model 152 associated with photosensitive user 302.

Figure 4:
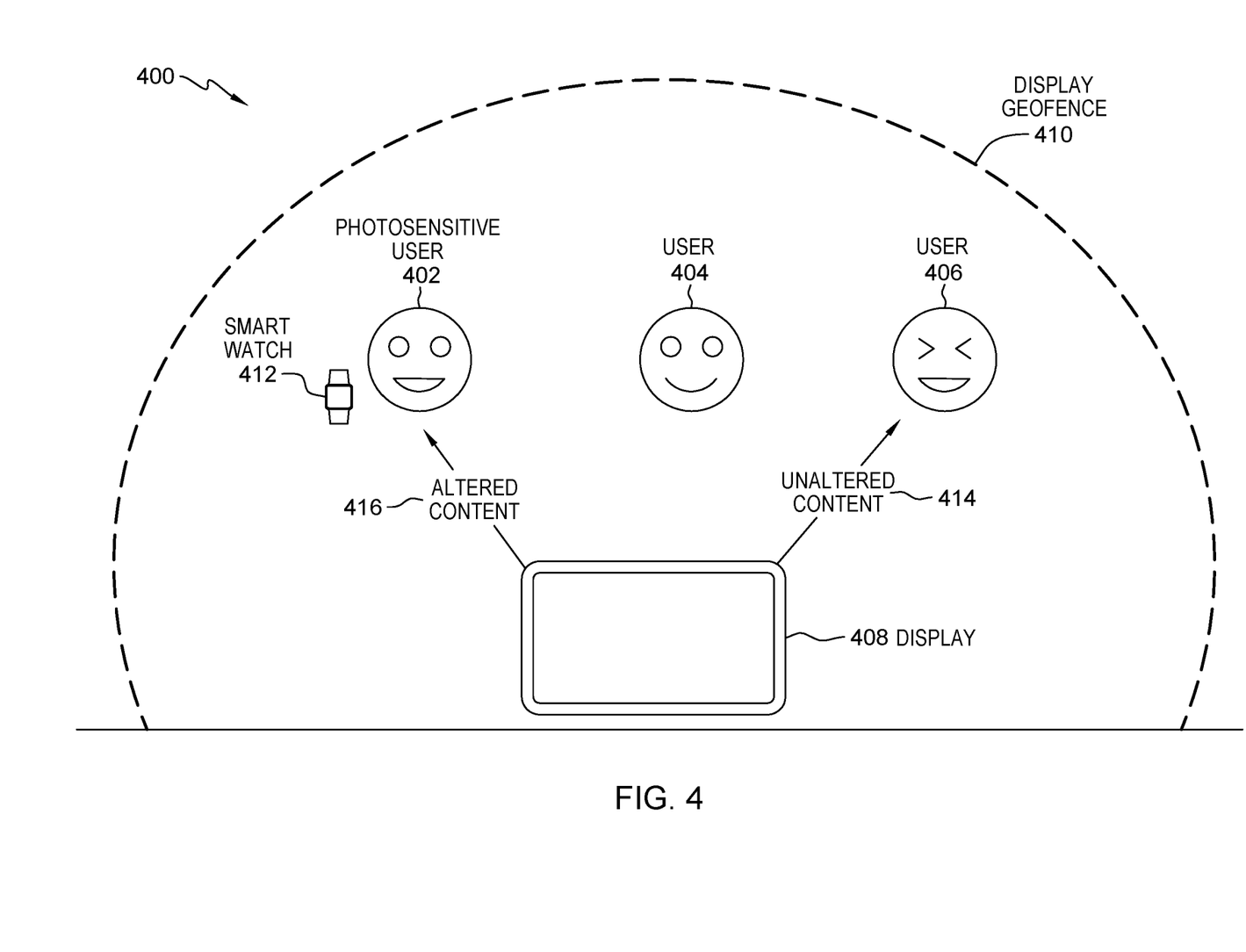
FIG. 4 depicts an example of the operational steps of the program within the computational environment of FIG. 1, in accordance with an embodiment of the present invention.

FIG. 4 depicts example 400, in accordance with an illustrative embodiment of the present invention. Example 400 depicts photosensitive user 402 watching television at a restaurant alongside user 404 and user 406. Here, photosensitive user 402 is wearing smart watch 412 which is capable of notifying photosensitive user 402. Program 150 establishes display geofence 410 surrounding the viewing area of display 408. Responsive to program 150 detecting photosensitive user 402, user 404, and user 406 entering display geofence 410, program 150 commences monitoring for pixel or content changes presented or to be presented on display 408. Responsive to program 150 identifying potentially photosensitive triggering pixel changes or content, program 150 creates a parallel visualization environment. Here, program 150 presents altered content 416 to photosensitive user 402 unbeknownst to user 404 and user 406. Simultaneously, program 150 continues to present unaltered content 414 to user 406. In addition, photosensitive user 402 also receives a notification on smart watch 412, alerting that said user is viewing altered content.

Figure 5:
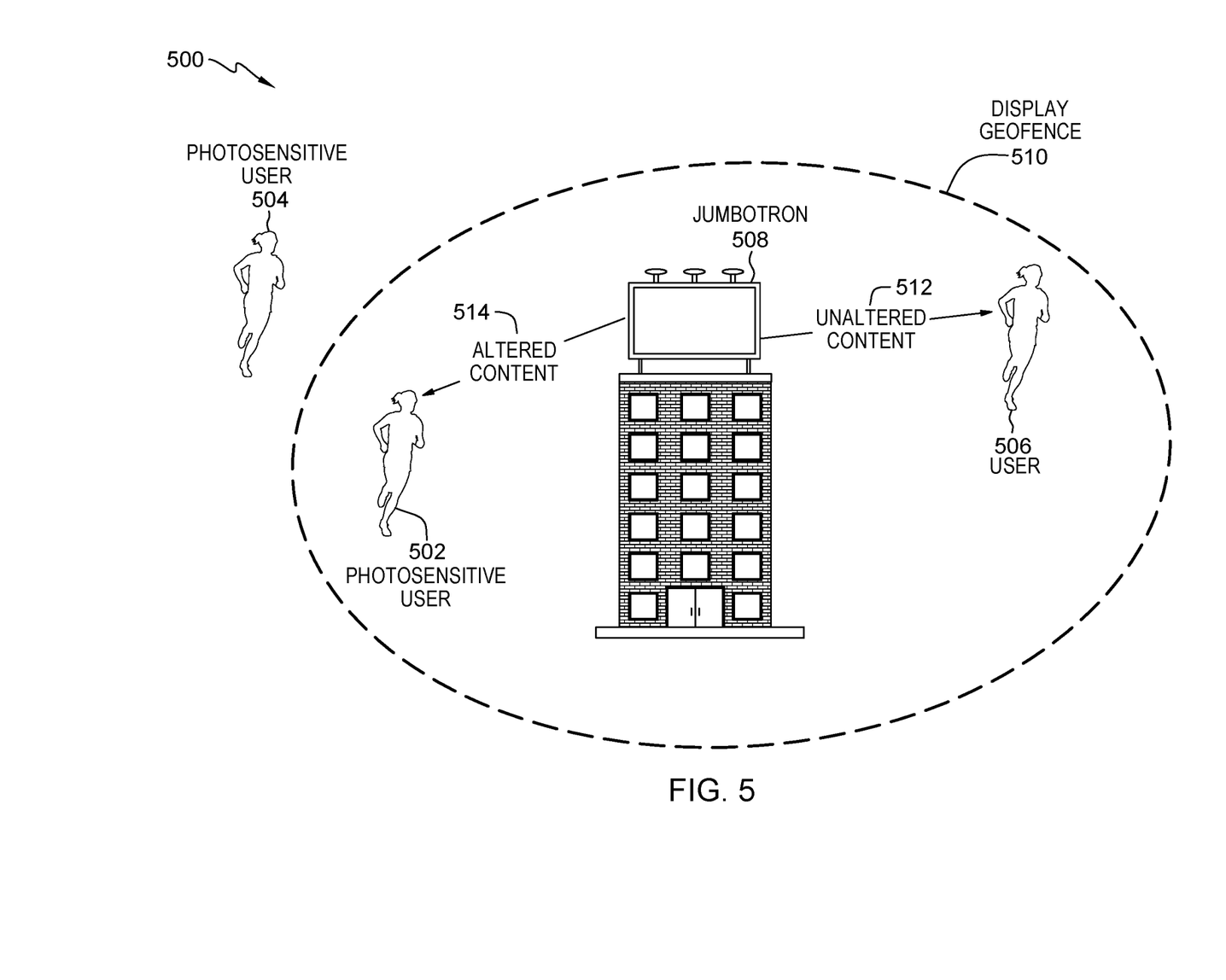
FIG. 5 depicts an example of the operational steps of the program within the computational environment of FIG. 1, in accordance with an embodiment of the present invention.

FIG. 5 depicts example 500, in accordance with an illustrative embodiment of the present invention. Example 500 depicts photosensitive user 502, photosensitive user 504, and user 506 at a sporting event with jumbotron 508 presenting a plurality of different content. Jumbotron 508 is associated with display geofence 510, created by program 150 based on the capabilities of jumbotron 508. Program 150 detects that photosensitive user 502 and user 506 are within display geofence 510 and continuously monitors jumbotron 508 for pixel changes that may impact photosensitive user 502. Subsequently, program 150 retrieves a trained model associated with photosensitive user 502. Program 150 also detects photosensitive user 504 but determines that photosensitive user 504 is not within viewable range of jumbotron 508 thus program 150 does not alter nor adjust any content for photosensitive user 504. Jumbotron 508 starts presenting flashing light patterns to motivate the crowd. Program 150 inputs the flashing light patterns into the retrieved model and calculates a photosensitivity score. Program 150, then compares the calculated photosensitivity score with a threshold associated with photosensitive user 502. Program 150 then determines that the flashing light patterns exceed said threshold. Responsively, program 150 and changes the pixels on the Jumbotron 508 to only change what photosensitive user 502 is viewing (i.e., altered content 514) while transmitting photosensitive user 502 a notification of altered content 514. Concurrently, user 506 continues to view unaltered content 512 (i.e., the flashing light patterns).

Figure 6:
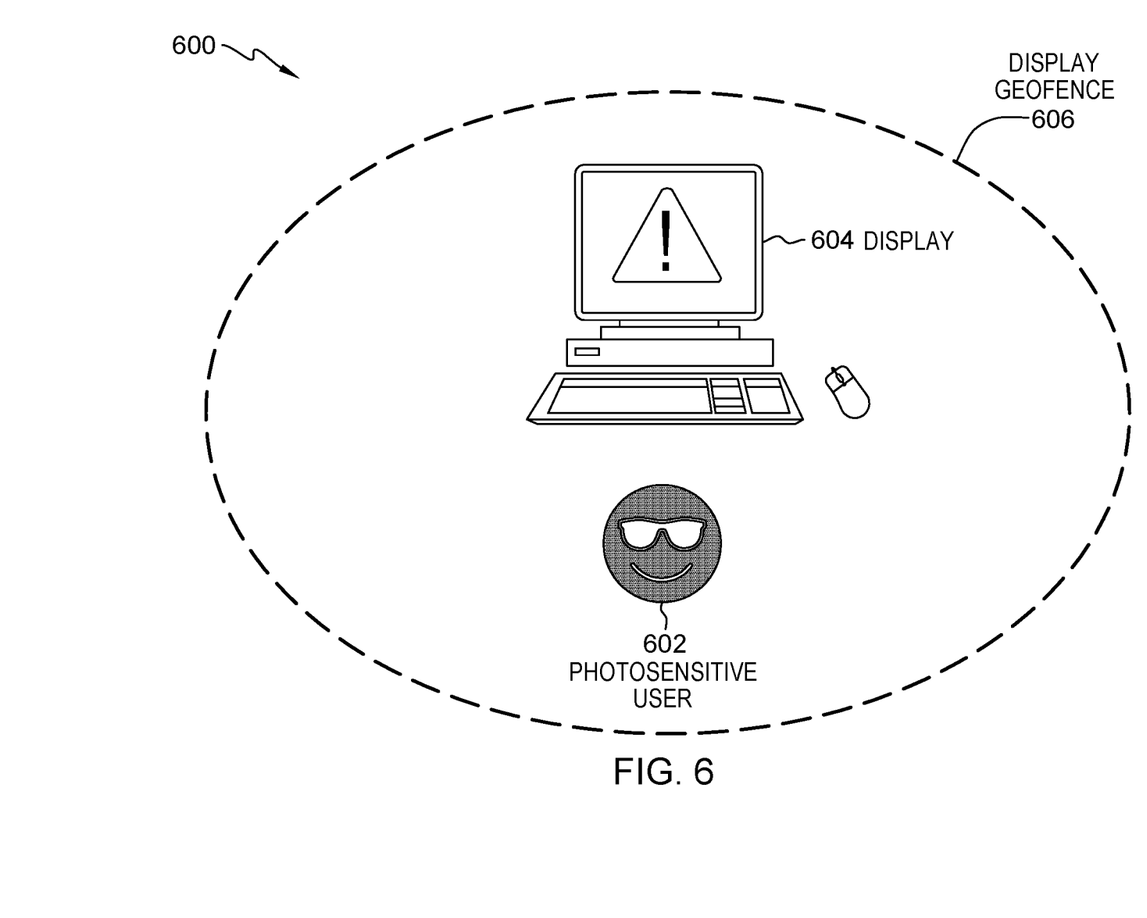
FIG. 6 depicts an example of the operational steps of the program within the computational environment of FIG. 1, in accordance with an embodiment of the present invention.

FIG. 6 depicts example 600, in accordance with an illustrative embodiment of the present invention. Example 600 depicts photosensitive user 602, an active gamer enjoying hours of video games in the evenings. Photosensitive user 602 has been playing for an extended period without a break while program 150 continuously monitors display 604 for potential photosensitive triggers and monitors for users within display geofence 606. Here, program 150 accounts for photosensitive user 602 extended computer use. Program 150 determines that an upcoming scene within the video game that might normally not be a trigger for photosensitive user 602, but due to the increased photosensitivity of photosensitive user 602 resulting from the gaming session, program 150 determines that the scene may cause a harmful reaction. Program 150 notifies photosensitive user 602 that the photosensitivity risk of photosensitive user 602 has become elevated due to prolonged exposure to the gaming content and the upcoming scene. Program 150 suspends the video game until an affirmative response from photosensitive user 602 is given to block the content, adjust the content, or continue to suspend the content until the associated photosensitivity risk has been lowered.

Figure 7:
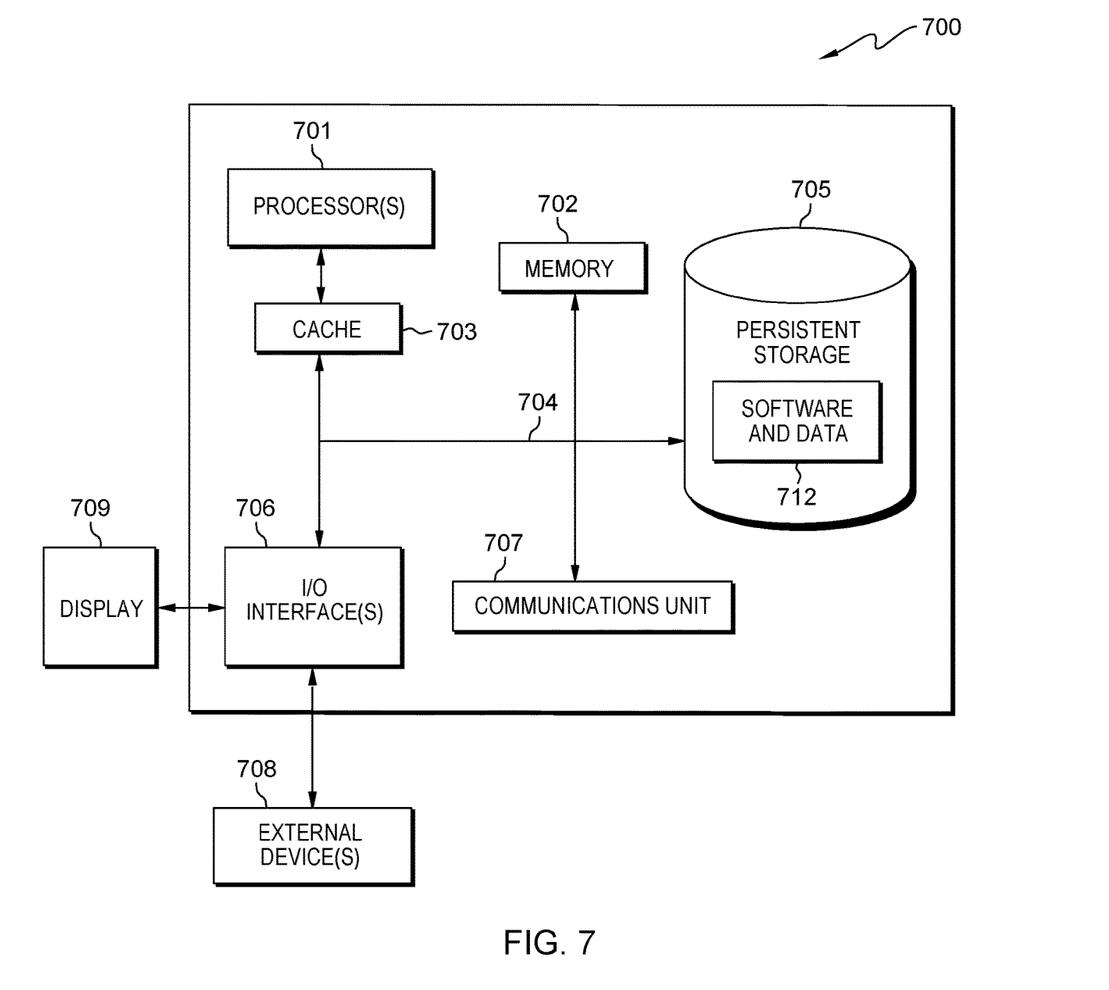
FIG. 7 is a block diagram of components of the server computer, in accordance with an embodiment of the present invention.

FIG. 7 depicts block diagram 700 illustrating components of computing device 110 and server computer 120 in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Computing device 110 and server computer 120 includes communications fabric 704, which provides communications between cache 703, memory 702, persistent storage 705, communications unit 707, and input/output (I/O) interface(s) 706. Communications fabric 704 can be implemented with any architecture designed for passing data and/or control information between processors (such as microprocessors, communications, and network processors, etc.), system memory, peripheral devices, and any other hardware components within a system. For example, communications fabric 704 can be implemented with one or more buses or a crossbar switch.

Memory 702 and persistent storage 705 are computer readable storage media. In this embodiment, memory 702 includes random access memory (RAM). In general, memory 702 can include any suitable volatile or non-volatile computer readable storage media. Cache 703 is a fast memory that enhances the performance of computer processor(s) 701 by holding recently accessed data, and data near accessed data, from memory 702.

Program 150 may be stored in persistent storage 705 and in memory 702 for execution by one or more of the respective computer processor(s) 701 via cache 703. In an embodiment, persistent storage 705 includes a magnetic hard disk drive. Alternatively, or in addition to a magnetic hard disk drive, persistent storage 705 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 705 may also be removable. For example, a removable hard drive may be used for persistent storage 705. Other examples include optical and magnetic disks, thumb drives, and smart cards that are inserted into a drive for transfer onto another computer readable storage medium that is also part of persistent storage 705. Software and data 712 can be stored in persistent storage 705 for access and/or execution by one or more of the respective processors 701 via cache 703.

Communications unit 707, in these examples, provides for communications with other data processing systems or devices. In these examples, communications unit 707 includes one or more network interface cards. Communications unit 707 may provide communications through the use of either or both physical and wireless communications links. Program 150 may be downloaded to persistent storage 705 through communications unit 707.

I/O interface(s) 706 allows for input and output of data with other devices that may be connected, respectively, to computing device 110 and server computer 120. For example, I/O interface(s) 706 may provide a connection to external device(s) 708, such as a keyboard, a keypad, a touch screen, and/or some other suitable input device. External devices 708 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 705 via I/O interface(s) 706. I/O interface(s) 706 also connect to a display 709.

Display 709 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   establishing, by one or more computer processors, a geofence surrounding a display having a plurality of pixels capable of change based on one or more display capabilities;
   monitoring, by the one or more computer processors, for a change in at least one pixel of the plurality of pixels;
   identifying, by one or more computer processors, a photosensitive user within the established geofence;
   responsive to the at least one pixel change associated with the display, calculating, by one or more computer processors, a photosensitivity score utilizing a model trained for one or more photosensitive conditions associated with the photosensitive user; and
   adjusting, by one or more computer processors, the display to show a change on the at least one pixel based on the calculated photosensitivity score.

2. The computer-implemented method of claim 1, further comprising:
   monitoring, by one or more computer processors, a location associated with the photosensitive user within the established geofence; and
   tracking, by one or more computer processors, eye movement associated with the photosensitive user within the established geofence.

3. The computer-implemented method of claim 2, further comprising:
   creating, by one or more computer processors, a parallel visualization environment utilizing the at least one pixel change, the monitored location associated with the photosensitive user, and the tracked eye movement associated with the photosensitive user.

4. The computer-implemented method of claim 3, wherein the parallel visualization environment only allows the photosensitive user to view at least one adjusted pixel change.

5. The computer-implemented method of claim 1, further comprising:
   responsive to the calculated photosensitive score, notifying, by one or more computer processors, the photosensitive user regarding the at least one pixel change.

6. The computer-implemented method of claim 1, further comprising:
   blocking, by one or more computer processors, the at least one pixel change associated with the display.

7. The computer-implemented method of claim 1, wherein the model is a recurrent neural network.

8. A computer program product comprising:
   one or more non-transitory computer readable storage media and program instructions stored on the one or more computer readable storage media, the stored program instructions comprising:
   program instructions to establish a geofence surrounding a display having a plurality of pixels capable of change based on one or more display capabilities;
   program instructions to monitor for a change in at least one pixel of the plurality of pixels;
   program instructions to identify a photosensitive user within the established geofence;
   program instructions to, responsive to the at least one pixel change associated with the display, calculate a photosensitivity score utilizing a model trained for one or more photosensitive conditions associated with the photosensitive user; and
   program instructions to adjust the display to show a change on the at least one pixel based on the calculated photosensitivity score.

9. The computer program product of claim 8, wherein the program instructions, stored on the one or more computer readable storage media, further comprise:
   program instructions to monitor a location associated with the photosensitive user within the established geofence; and
   program instructions to track eye movement associated with the photosensitive user within the established geofence.

10. The computer program product of claim 9, wherein the program instructions, stored on the one or more computer readable storage media, further comprise:
    program instructions to create a parallel visualization environment utilizing the at least one pixel change, the monitored location associated with the photosensitive user, and the tracked eye movement associated with the photosensitive user.

11. The computer program product of claim 10, wherein the parallel visualization environment only allows the photosensitive user to view at least one adjusted pixel change.

12. The computer program product of claim 8, wherein the program instructions, stored on the one or more computer readable storage media, further comprise:
    program instructions to, responsive to the calculated photosensitive score, notify the photosensitive user regarding the at least one pixel change.

13. The computer program product of claim 8, wherein the program instructions, stored on the one or more computer readable storage media, further comprise:
    program instructions to block the at least one pixel change associated with the display.

14. The computer program product of claim 8, wherein the model is a recurrent neural network.

15. A computer system comprising:
    one or more computer processors;
    one or more computer readable storage media; and
    program instructions stored on the computer readable storage media for execution by at least one of the one or more processors, the stored program instructions comprising:
    program instructions to establish a geofence surrounding a display having a plurality of pixels capable of change based on one or more display capabilities;
    program instructions to monitor for a change in at least one pixel of the plurality of pixels;
    program instructions to identify a photosensitive user within the established geofence;

program instructions to, responsive to the at least one pixel change associated with the display, calculate a photosensitivity score utilizing a model trained for one or more photosensitive conditions associated with the photosensitive user; and program instructions to adjust the display to show a change on the at least one pixel based on the calculated photosensitivity score.

16. The computer system of claim 15, wherein the program instructions, stored on the one or more computer readable storage media, further comprise:

program instructions to monitor a location associated with the photosensitive user within the established geofence; and program instructions to track eye movement associated with the photosensitive user within the established geofence.

17. The computer system of claim 16, wherein the program instructions, stored on the one or more computer readable storage media, further comprise:

program instructions to create a parallel visualization environment utilizing the at least one pixel change, the monitored location associated with the photosensitive user, and the tracked eye movement associated with the photosensitive user.

18. The computer system of claim 17, wherein the parallel visualization environment only allows the photosensitive user to view at least one adjusted pixel change.

19. The computer system of claim 15, wherein the program instructions, stored on the one or more computer readable storage media, further comprise:

program instructions to, responsive to the calculated photosensitive score, notify the photosensitive user regarding the at least one pixel change.

20. The computer system of claim 15, wherein the program instructions, stored on the one or more computer readable storage media, further comprise:

program instructions to block the at least one pixel change associated with the display.

\* \* \* \* \*